(12) United States Patent
Mullett

(10) Patent No.: US 10,163,377 B2
(45) Date of Patent: Dec. 25, 2018

(54) PROGRAMMABLE BASE TO HOLD AND ILLUMINATE A PANEL ASSEMBLY

(71) Applicant: Laser's Edge, LLC, Akron, OH (US)

(72) Inventor: Craig E. Mullett, North Canton, OH (US)

(73) Assignee: Laser's Edge, LLC, North Canton, OH (US)

( * ) Notice: Subject to any disclaimer, the term of this patent is extended or adjusted under 35 U.S.C. 154(b) by 0 days.

(21) Appl. No.: 15/483,605

(22) Filed: Apr. 10, 2017

(65) Prior Publication Data

US 2018/0108282 A1 Apr. 19, 2018

Related U.S. Application Data

(60) Provisional application No. 62/407,563, filed on Oct. 13, 2016.

(51) Int. Cl.

| G09F 13/18 | (2006.01) |
|---|---|
| G09F 13/00 | (2006.01) |
| G09F 27/00 | (2006.01) |
| F21V 8/00 | (2006.01) |
| H05B 37/02 | (2006.01) |
| H05B 33/08 | (2006.01) |
| G06F 3/16 | (2006.01) |
| G09F 13/22 | (2006.01) |

(52) U.S. Cl.
CPC ........... *G09F 13/18* (2013.01); *G02B 6/0068* (2013.01); *G02B 6/0076* (2013.01); *G02B 6/0083* (2013.01); *G09F 13/005* (2013.01); *G09F 27/00* (2013.01); *H05B 33/0857* (2013.01); *H05B 37/029* (2013.01); *G06F 3/165* (2013.01); *G09F 2013/185* (2013.01); *G09F 2013/222* (2013.01); *G09F 2027/002* (2013.01)

(58) Field of Classification Search
None
See application file for complete search history.

(56) References Cited

U.S. PATENT DOCUMENTS

| 2,623,313 A | 12/1952 | Fuchs |
| 5,365,686 A * | 11/1994 | Scott ............... A47G 1/0616 40/455 |
| 5,433,024 A | 7/1995 | Lerner |
| 5,743,616 A | 4/1998 | Giuliano et al. |
| 5,842,297 A * | 12/1998 | Tung ............... G02B 6/0038 362/812 |
| 6,073,374 A | 6/2000 | Tingmo |
| 6,241,362 B1 * | 6/2001 | Morrison ............ F21S 10/02 362/231 |

(Continued)

*Primary Examiner* — Kristina N Junge
(74) *Attorney, Agent, or Firm* — Sand & Sebolt; Howard L. Wernow

(57) ABSTRACT

A universal base for one or more panel assemblies has a processor that receives and processes instructions from at least one non-transitory computer readable storage medium. The instructions direct an illumination sequence to be executed by the processor to illuminate lights in the base. The at least one non-transitory computer readable storage medium is removably connected to the base such that when it is removed and a different second non-transitory computer readable storage medium is connected with the base, the lights are illuminated in a second illumination sequence in accordance with a set of second illumination instructions.

15 Claims, 11 Drawing Sheets

(56) References Cited

U.S. PATENT DOCUMENTS

| | | | |
|---|---|---|---|
| 6,308,444 B1 | 10/2001 | Ki | |
| 6,481,130 B1* | 11/2002 | Wu | F21V 13/04 362/297 |
| 6,615,520 B2* | 9/2003 | Landers, Jr. | G02B 6/0065 40/1.5 |
| 7,024,809 B1 | 4/2006 | Poma | |
| 7,246,932 B2* | 7/2007 | Burtsev | G02B 6/0001 362/23.16 |
| 7,903,103 B2* | 3/2011 | Osterberg | G09F 15/00 345/204 |
| 8,234,804 B1 | 8/2012 | Rush | |
| 2004/0045199 A1 | 3/2004 | Ki | |
| 2006/0179695 A1* | 8/2006 | Karlsson | G02B 6/0065 40/542 |
| 2007/0062085 A1* | 3/2007 | Pan | G09F 13/18 40/546 |
| 2007/0234608 A1* | 10/2007 | Morrison | G09F 13/00 40/546 |
| 2011/0088292 A1 | 4/2011 | Kay et al. | |
| 2013/0312300 A1* | 11/2013 | Lee | H05B 33/0863 40/541 |
| 2014/0047742 A1* | 2/2014 | Schloss | G09F 13/18 40/546 |

\* cited by examiner

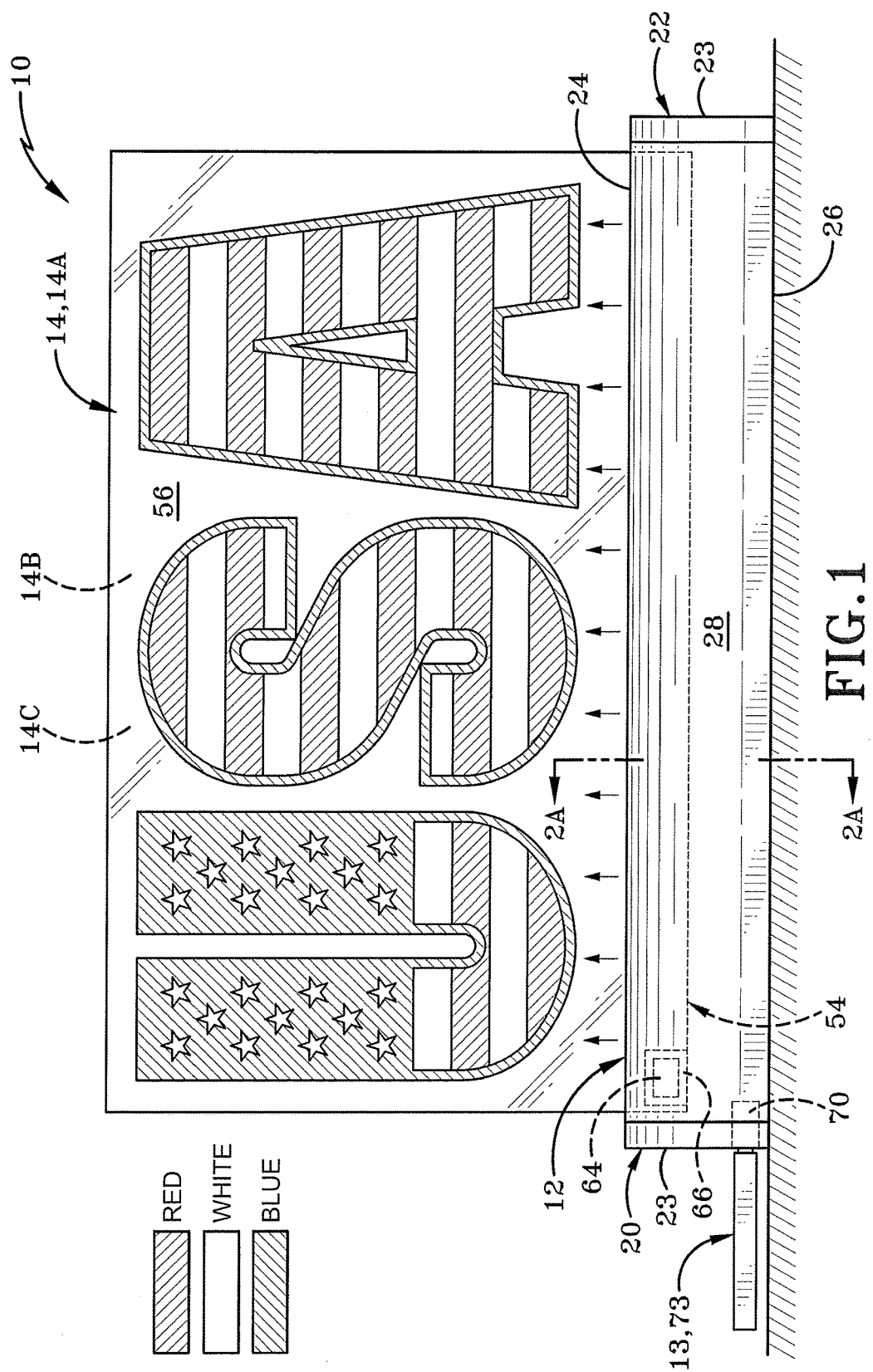

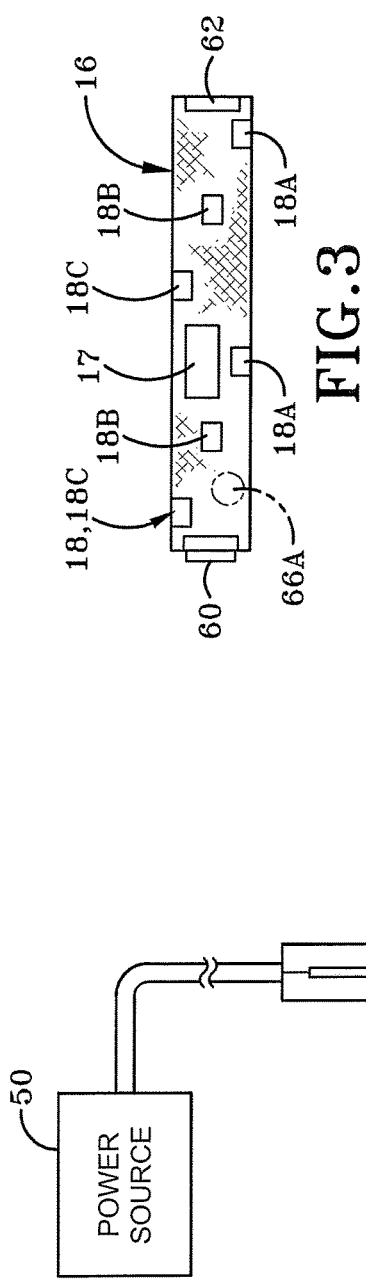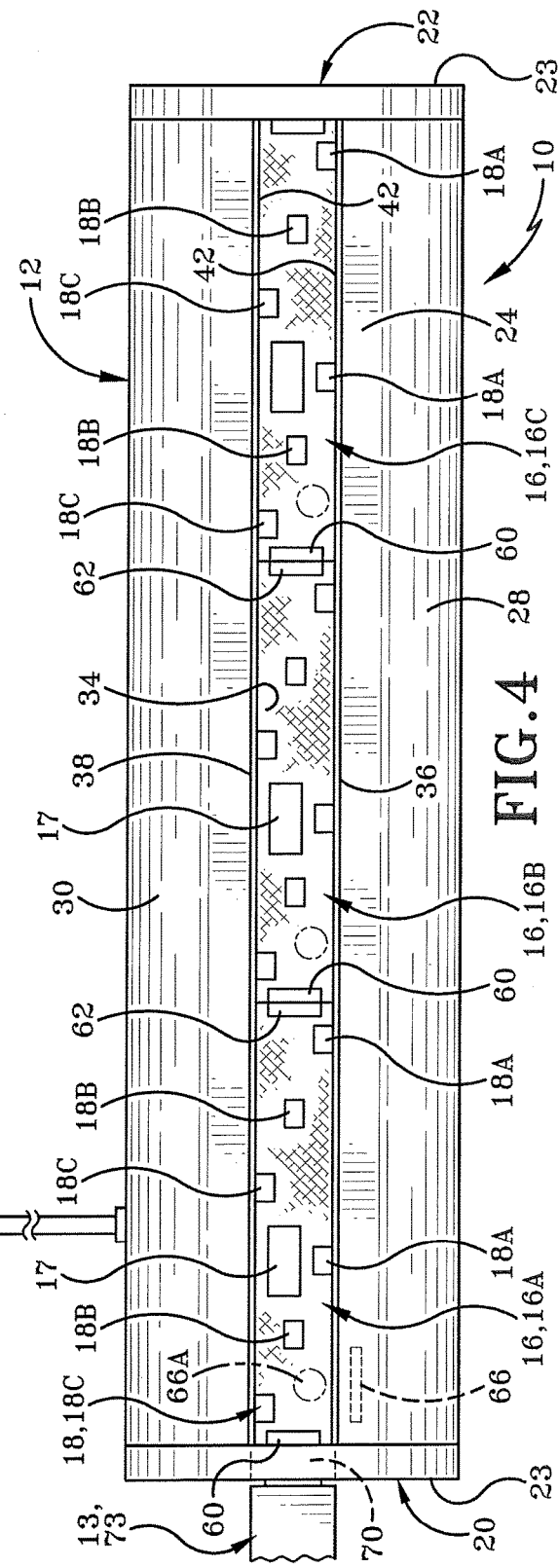

PROGRAMMABLE BASE TO HOLD AND ILLUMINATE A PANEL ASSEMBLY

CROSS REFERENCE TO RELATED APPLICATIONS

This application claims the benefit of prior U.S. Provisional Patent Application Ser. No. 62/407,563, filed on Oct. 13, 2016; the disclosure of which is entirely incorporated herein by reference.

BACKGROUND

Technical Field

The present disclosure relates generally to display systems. More particularly, the present disclosure relates to a base for illuminating an etched acrylic panel. Specifically, the present disclosure relates to a programmable base having a receiver connected to a microprocessor for selectively illuminating a panel assembly in a preprogrammed manner.

Background Information

Laser etching, or laser engraving, is a process utilizing a laser to engrave a design on an object. Typically, acrylic panels are utilized as the medium upon which the design is laser etched. Artists typically prefer acrylic panels because they may be illuminated with light such that the etched portion of the acrylic panel reflects and illuminates the color of the light being passed through the acrylic panel. However, other types of etching of acrylic panels can accomplish similar effects. For example, mechanical etching, rotary etching or sand-blasting could also be used to create etched panels.

Previously known laser etched acrylic panels consist of a base for housing a row of lights therein to illuminate the panel. Previous laser etched systems only have a single row of lights that illuminate in a single color. For example, U.S. Pat. Nos. 5,433,024 and 8,234,804 disclose a conventional base design for holding a single acrylic panel and lightened the same with a single row of lights.

Moreover, the prior art is limited because these systems do not incorporate programmable technology to enable the lights to change colors, intensity, or duration. However, some prior art indicates that a programmable logic controller may be used to execute animation effects. For example, U.S. Pat. No. 6,308,444 and U.S. Patent Application Publication No. 2004/0045199 indicate that it is possible to change the colors of the lights to accomplish an animation effect of the letters/figures inscribed on the plates of the panel assembly. While U.S. Pat. No. 6,308,444 and U.S. Patent Application Publication No. 2004/0045199 identify that the animation effects can change in color during the course of their animation effect, the animation effect (or animation sequence) is static and does not change. Stated otherwise, the animation effect enables the changing of colors, but the animation effect (or animation sequence) is the exact same sequence for every panel that is to be illuminated by the lights.

SUMMARY

Issues continue to exist with currently known bases for illuminating etched acrylic panels. Some issues relate to a single color light source illuminating a single panel at a single intensity. Other issues relate to animation sequences (also referred to as illumination sequences) are static and unable to be changed by the user based on the design of the panel assembly. It is desirable to provide an improved system to incorporate more light sequencing (e.g. animations), colors, intensities that are selectively controlled by the user based on a set of selectively attachable instructions that can be read by a processor in the base. It is believed that this should provide greater overall control for the operator which results in an improved experience for the observer. Furthermore, it enables the base to be a universal base that can be selectively connected with a plurality of panel assemblies having different designs and different sets of instructions that control the illumination sequences. The present disclosure addresses these and other issues.

In one aspect, an embodiment of the present disclosure may provide a system comprising: a panel assembly formed with a design adapted to be illuminated; a signal transmitter carried by the panel assembly outputting a signal adapted to direct the design illumination; a base carrying a plurality of lights disposed proximate a channel receiving a portion of the panel assembly therein; and a receiver for receiving the signal and directing the plurality of lights in accordance with the signal.

In another aspect, an embodiment of the present disclosure may provide a system comprising: a panel assembly formed with a design adapted to be illuminated; a base carrying a plurality of lights disposed proximate a channel sized to repeatably receive receiving a portion of the panel assembly therein; at least one processor; at least one computer readable storage medium having instructions encoded thereon that, when executed by the at least one processor, results in illuminating the panel assembly in a sequenced manner; and wherein the instructions are associated with the panel assembly so as to allow the base to be universally utilized when other panel assemblies are connected with the base for illumination based on other instructions from a different storage medium.

In yet another aspect, an embodiment of the present disclosure may provide a method comprising the steps of: providing a base defining a channel sized to receive a first panel assembly having a design thereon, and the base including a plurality of lights configured to illuminate the first panel assembly; inserting the first panel assembly into the channel; providing a set of first instructions encoded on a first non-transitory computer readable storage medium that when executed by at least one processor, results in illuminating the first panel assembly with the plurality of lights in a first sequenced manner; selectively connecting the first non-transitory computer readable storage medium to the at least one processor; executing the set of first instructions in the at least one processor; illuminating the first panel assembly with the plurality of lights in the first sequenced manner in accordance with the set of first instructions; and removing the first panel assembly from the channel and disconnecting the first non-transitory computer readable storage medium; inserting a second panel assembly into the channel; providing a set of second instructions encoded on a second non-transitory computer readable storage medium that when executed by the at least one processor, results in illuminating the second panel assembly with the plurality of lights in a second sequenced manner.

In yet another aspect, an embodiment of the present disclosure may provide a base for receiving a panel assembly to be illuminated, the base comprising: a plurality of lights positioned within a channel; a ledge proximate the channel adapted to support a panel assembly to be illuminated; a processor in operative communication with the plurality of lights configured to receive a set of instructions encoded in a memory device; a receiving port that connects with the memory device to pass the instructions therethrough as the instructions are sent to the processor; and wherein the instructions dictate an illumination sequence for the plurality of lights to illuminate the panel assembly.

In yet another aspect, an embodiment of the present disclosure may provide a method comprising: providing a set of first instructions encoded on a first non-transitory computer readable storage medium that when executed by at least one processor, results in illuminating at least one light in a first sequenced manner; connecting, in a selective and releasable manner, the first non-transitory computer readable storage medium to the at least one processor in electrical communication with the at least one light; executing the set of first instructions in the at least one processor carried by a base that also support the at least one light; and Illuminating the at least one light in the first sequenced manner.

In yet another aspect, an embodiment of the present disclosure may provide a universal base for one or more panel assemblies has a processor that receives and processes instructions from at least one non-transitory computer readable storage medium. The instructions direct an illumination sequence to be executed by the processor to illuminate lights in the base. The at least one non-transitory computer readable storage medium is removably connected to the base such that when it is removed and a different second non-transitory computer readable storage medium is connected with the base, the lights are illuminated in a second illumination sequence in accordance with a set of second illumination instructions.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 1 is a front elevation view of the programmable base system for holding and illuminating an etched member in accordance with the present disclosure.

FIG. 3 is a top plan view of a printed circuit board carrying light emitting diodes.

FIG. 4 is a top view of the base carrying multiple printed circuit boards daisy chained together.

Similar numbers refer to similar parts throughout the drawings.

DETAILED DESCRIPTION

Figure 2A:
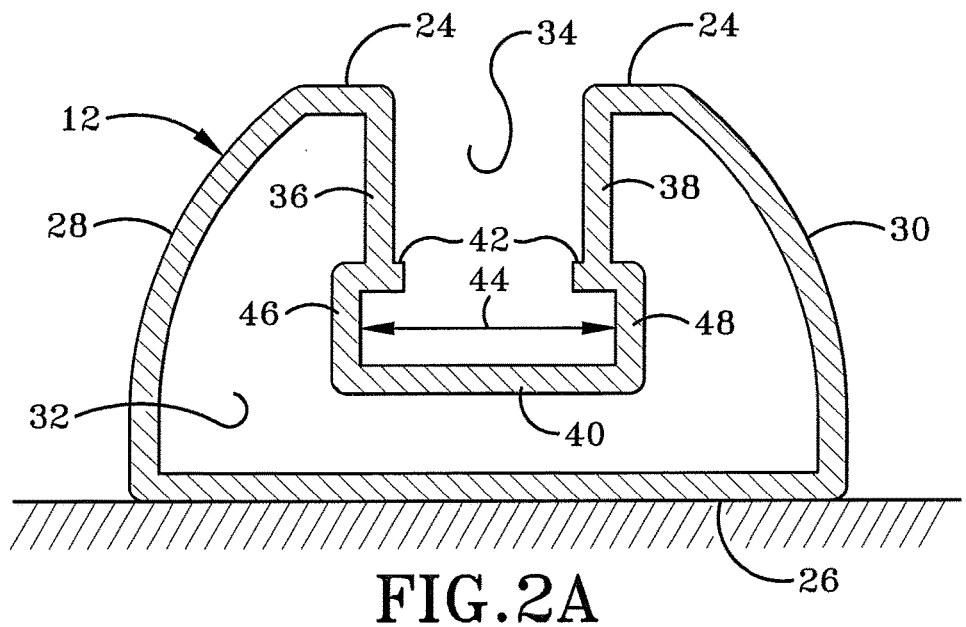
FIG. 2A is a cross section of the base taken along line 2A-2A in FIG. 1.

A system for a programmable base holding and illuminating an etched member is shown generally at 10. The system 10 may include a base 12, a panel assembly 14, and a circuit board 16 (FIG. 3) carrying a plurality of light emitting diodes (LED) 18. As will be described in greater detail below, the LEDs 18 are housed within base 12 to illuminate the panel assembly 14. The system 10 further includes at least one non-transitory computer readable storage medium 13 having a set of first instructions encoded thereon, that when executed by at least one processor, results in illuminating or the illumination of the panel assembly 14 in a first sequenced manner, which also may be referred to as a first illumination sequence or a first animation sequence. Thus, the storage medium 13 may also generally or broadly be considered an input device inasmuch as storage medium 13 carries the instructions that direct the illumination sequence. One non-limiting example of the system 10 is that base 12 may be considered a universal base inasmuch as it is configured to receive the panel assembly 14, which may be referred to as a first panel assembly 14, but is also configured to accept or receive other panel assemblies of a similar size that are associated with other instructions carried by a different non-transitory computer readable storage medium. Thus, base 12 and the LEDs 18 may illuminate any type of panel that has associated instructions encoded on a medium rather than merely following one set of static and unchangeable preprogrammed animation sequences.

FIG. 1 depicts the base 12 including a first end 20 opposite a second end 22 defining a longitudinal direction therebetween. Base 12 includes an upwardly facing top surface 24 spaced from a downwardly facing bottom surface 26 defining a vertical direction therebetween. In one particular embodiment, base 12 is formed from extruded aluminum. However, it is to be understood that other materials and fabrication means are entirely possible to construct base 12. The extruded aluminum base 12 is contemplated as being cost efficient and easy to configure the internal components and structures of base 12 which will be described in greater detail with reference to FIG. 2A-FIG. 2F. Base 12 may further include end caps 23 which respectively define the first end 20 and the second end 22. The end caps 23 may have downwardly extending legs or protrusions so as to allow the base 12 to be slightly elevated above the horizontal surface upon which the end caps 23 are supported by. However, it is to be understood that the end caps 23 may be flush with the bottom of the base such that a full contact arrangement is accomplished between the bottom of the base and the horizontal surface supporting base 12.

As depicted in FIG. 2A-FIG. 2F, base 12 includes a forwardly facing front surface spaced opposite from a rearwardly facing rear surface defining a transverse direction therebetween. In one particular embodiment, base 12 may define a hollow chamber 32 bound by the walls forming the front surface 28 and the rear surface 30. However, other configurations could easily provide a solid base to provide more mass resulting in greater stability for retaining panel assembly 14 thereon.

As depicted in FIG. 2A, the base 12 includes a pair of parallel longitudinally extending walls extending vertically into the hollow chamber 32 defining a longitudinally extending channel 34 therebetween. A first wall 36 of the pair of walls may be associated with the front of base 12 and a second wall 38 may be associated with the rear of base 12. A transversely and longitudinally extending bottom wall 40 may connect the first wall 36 and the second wall 38 at the vertically lowermost portion of each respective wall, wherein the bottom wall 40 is disposed above the bottom surface 26 of base 12. A ledge 42 may extend inwardly into the channel 34 from the first wall 36 and from the second wall 38. The ledge 42 is positioned above a lower portion 46 on the first wall 36 and a lower portion 48 on the second wall 38. The lower portion 46 of wall 36 and the lower portion 48 of wall 38 define a wider section 44 of channel 34 closely adjacent the bottom wall 40. As will be described in greater detail below, the wider section 44 of channel 34 is configured to house the circuit board 16 beneath ledge 42. Moreover, ledge 42 is configured to support the panel assembly 14 thereon. Alternatively, designs may provide a channel having a constant width.

Figure 2B:
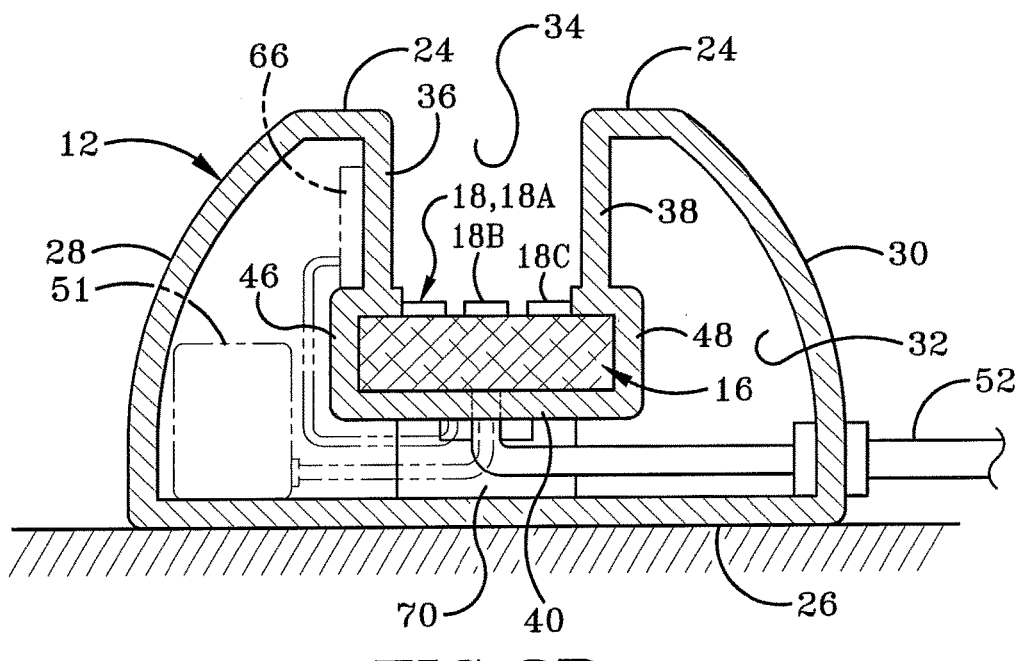
FIG. 2B is a cross section of a partially assembled base carrying a printed circuit board therein.

As depicted in FIG. 2B, the circuit board 16 may be disposed within the lower portion of channel 34. In one particular embodiment, the circuit board 16 has a transverse width that is similar to that of the width of the lower wider portion 44 of channel 34. In this configuration, the circuit board 16 may contact the inner surfaces of the lower portion 46 of wall 36 and the lower portion 48 of wall 38, and be supported above the upwardly facing top surface of lower wall 40. The LEDs 18 may face upwardly in order to illuminate light through the panel assembly 14 as will be described in greater detail below.

With continued reference to FIG. 2B, the LEDs 18 may include at least one front LED 18A, at least one intermediate LED 18B, and at least one rear LED 18C. The terms "front", "intermediate", and "rear", with respect to LEDs 18 are not intended to be limiting and are used herein for descriptive purposes relative to the portions of the base 12 such that the front LED 18A is associated with being offset towards the front surface 28 of base 12 and the rear LED 18C is associated with being offset towards the rear surface 30 of base 12. Intermediate LED 18B is transversely intermediate the front LED 18A and the rear LED 18C. The top surface of the LEDs 18 may be positioned slightly below ledge 42 to create a small gap between the bottom surface of panel assembly 14 when the panel assembly 14 is disposed within channel 34. However, in alternative embodiments, a direct contact of the bottom surface of the panel assembly 14 may be established between the LEDs 18 and the panel assembly 14 creating an interface therebetween. The LEDs 18 may receive their power from a power source 50 external to the base 12 connected thereby via an electrical line 52 extending through a portion of the sidewall of base 12. Alternatively, the LEDs 18 may receive their power from a rechargeable power source such as a lithium ion battery 51. Inasmuch as the lithium ion battery 51 is an alternative embodiment, it is depicted in FIG. 2B in dashed lines to represent its alternative presence. Furthermore, an exemplary embodiment may utilize both the external power source 50 and the rechargeable lithium ion battery 51 in order to give the end user either option of powering system 10. In this scenario, when the base 12 is plugged into power source 50 via line 52, the external power source 50 may repeatably charge the lithium ion battery 51. Then, when the plug is removed from the external power source 50, the system 10 may be entirely powered by lithium ion battery 51.

With continued reference to FIG. 2B, it is shown that the width associated with the lower wider portion 44 of channel 34 is at least three times greater than the width associated with one of the LEDs 18. This enables the LEDs 18 to be aligned front to back in at least three rows to illuminate light from the LED 18 upwardly towards the panel assembly 14. In one particular embodiment, the width of the lower wider portion 44 of the channel 34 is in a range from about ½ inch to about two inches.

Figure 2C:
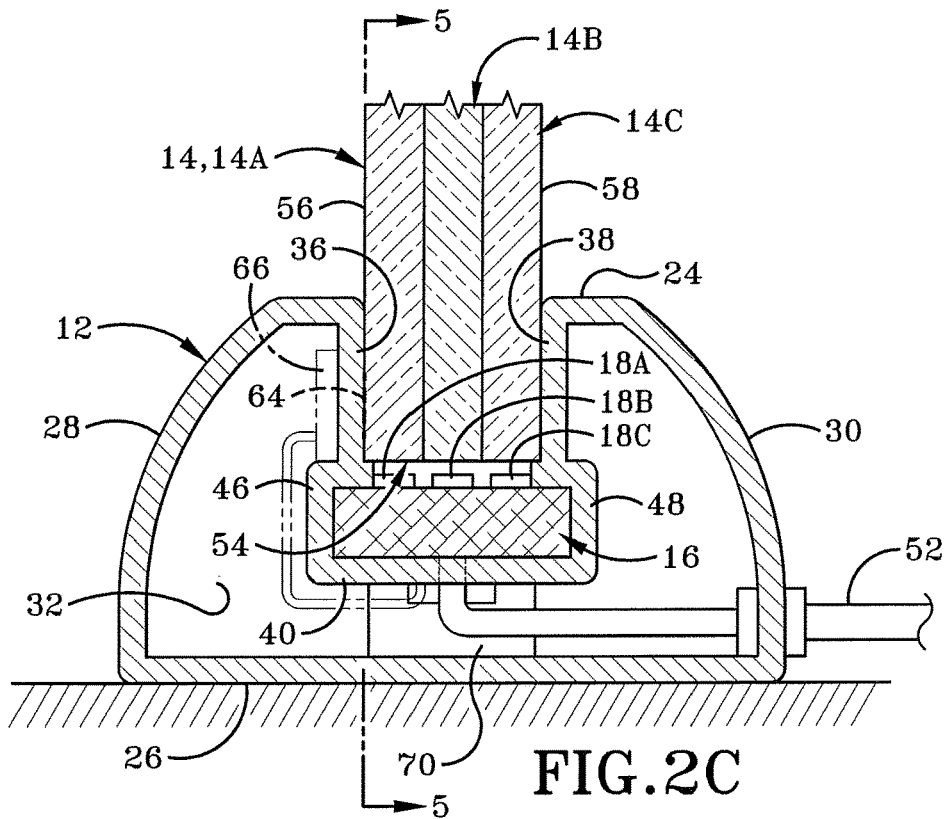
FIG. 2C is a cross section of the base carrying one embodiment of a panel assembly.

FIG. 2C depicts the panel assembly 14 being installed vertically within the channel 34 such that a collective lower edge 54 is supported by ledge 42. Panel assembly 14 includes a generally planar first surface 56 facing forwardly and contacting the first wall 36 near the lower portion of first surface 56. Panel assembly 14 further includes a rearwardly facing second surface 58 contacting the inner surface of the second wall 38 near the lower portion of the rear surface 58.

In one particular embodiment, the panel assembly 14 is formed from three planar panels aligned tandemly. More particularly, a first panel 14A defines the forwardly facing first surface 56 of panel assembly 14. An intermediate second panel 14B is positioned behind the first panel 14A and a rear third panel 14C defines the rearwardly facing second surface 58 of panel assembly 14 and is positioned behind the intermediate second panel 14B.

FIG. 2C further depicts a scenario where the intermediate panel 14B is in direct contact engagement at its forward and rear surface creating an interface between the forward first panel 14A and the rear third panel 14C respectively. Other alternative embodiments may provide a scenario where three panels are aligned front to back, but there is a space or a gap defined therebetween such that a non-contact alignment is provided.

With continued reference to the panel assembly 14, one embodiment may provide three panels 14A, 14B, and 14C chemically or mechanically connected near the collective lower edge 54. The individual panels 14A, 14B, and 14C may be formed from a variety of known materials used in laser etching. However, the most preferable material is acrylic that is laser etched with a design.

An exemplary design etched onto the panel assembly 14 is shown in FIG. 1 with the patriotic red, white, and blue theme. To form this patriotic-themed design, a portion of the first panel 14A is laser etched to represent a partial design of the collective patriotic theme. Similarly, intermediate second panel 14B is laser etched with a partial design of the collective patriotic theme. Lastly, the rear third panel 14C is partially etched with a portion of the collective patriotic theme. In one embodiment, the features of the patriotic design that are to light up a first color such as red, may be laser etched on the forward first panel 14A. The portions of the patriotic theme that light up white may be laser etched on the intermediate second panel 14B. And, the blue portions that light up may be etched on the rear third panel 14C. It is to be understood that the patriotic theme displayed in FIG. 1 is not intended to be limiting and this may be shown with various sports themes such as team logos or other well-known symbols such as familiar trademarks and other artistic designs.

In one exemplary embodiment, the panels 14A, 14B, and 14C are formed from an acrylic material enabling the laser etching of the designs stated above. Typically, acrylic panels may be fabricated in either a cast acrylic or extruded acrylic manner. In one particular embodiment, the panels 14A, 14B, and 14C are formed from cast acrylic because it has better optical properties for the transmission of light therethrough than extruded acrylic panels.

In addition to the panels 14A, 14B, and 14C being laser etched to create an overall design, it is also possible for the panels to be printed on to create a portion of the design. Alternatively, one side, such as rear surface 58 of the panels, may be painted or coated entirely black so as to create a black background. Using backgrounds and other printed designs in combination with the laser etchings, an artist is able to create a significant design aesthetic than is known with a conventional etched single panel.

Figure 2D:
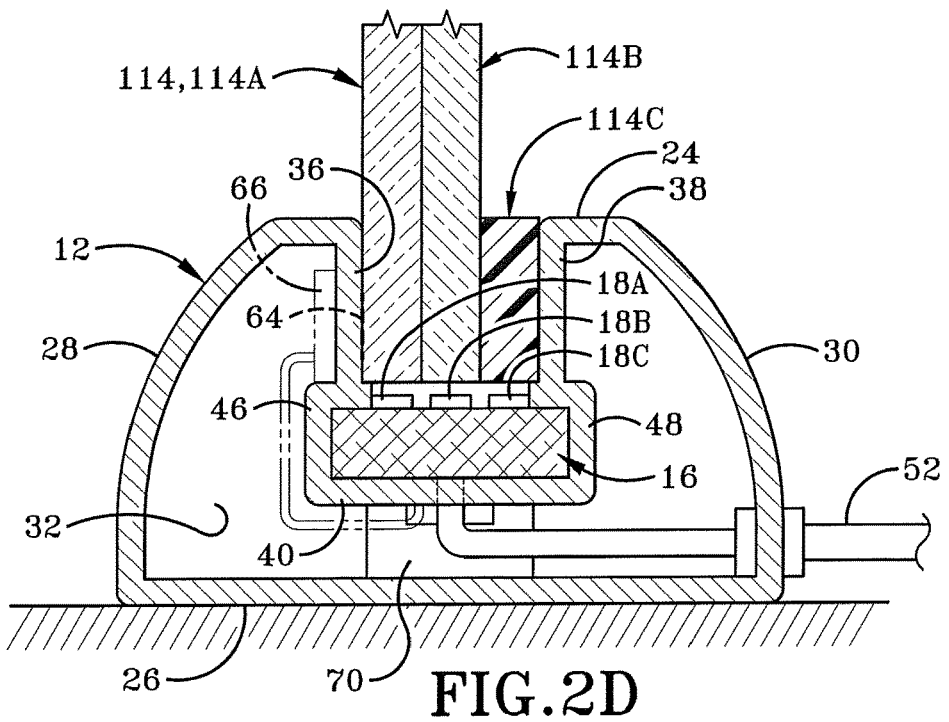
FIG. 2D is a cross section of the base carrying a second embodiment of the panel assembly.

FIG. 2D depicts an alternate embodiment of a panel assembly 114 in accordance with the present disclosure. Panel assembly 114 includes a forward first panel 114A, an intermediate second panel 114B, and a rear spacer 114C. In this embodiment, the spacer 114C may be either opaque or transparent. In each scenario, the spacer 114C has an upwardly facing top surface terminating significantly below the top surface of first and second panels 114A, 114B. As will be described in greater detail below, the spacer 114C may be used to selectively block light emitted from the third LED 18C associated with the back row of LEDs 18. First panel 114A and second panel 114B are laser etched with a design, while the spacer 114C is likely not etched.

Figure 2E:
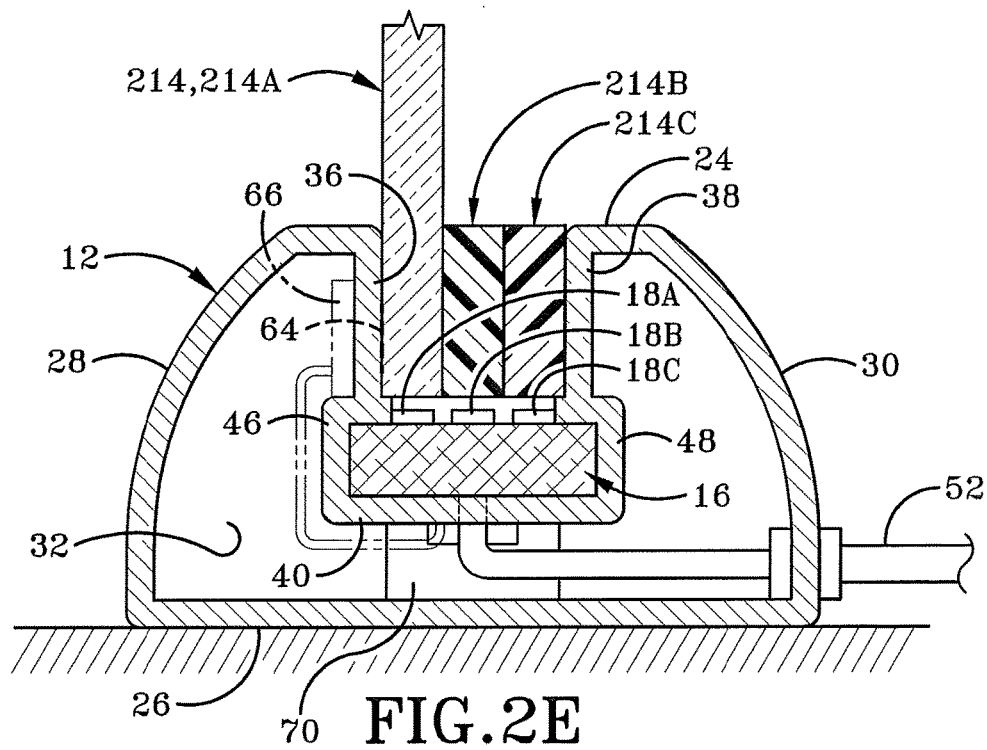
FIG. 2E is a cross section of the base carrying a third embodiment of the panel assembly.

As depicted in FIG. 2E, an alternative embodiment of a panel assembly 214 is provided. Panel assembly 214 may include a front first panel 214A, an intermediate spacer 214B, and a rear spacer 214C. Spacers 214B, 214C may be either opaque or transparent. Collectively, spacers 214B, 214C prevent light emitted from LED 18B and LED 18C from penetrating into or through the panel 214A. Spacers 214B, 214C are shown as having an equal vertical height. However, this is not intended to be limiting as spacers 214B, 214C may have alternative heights so long as the spacers 214B, 214C are shorter than etched panel 214A. First panel 214A is laser etched with a design, while the spacers 214B, 214C are likely not etched.

Figure 2F:
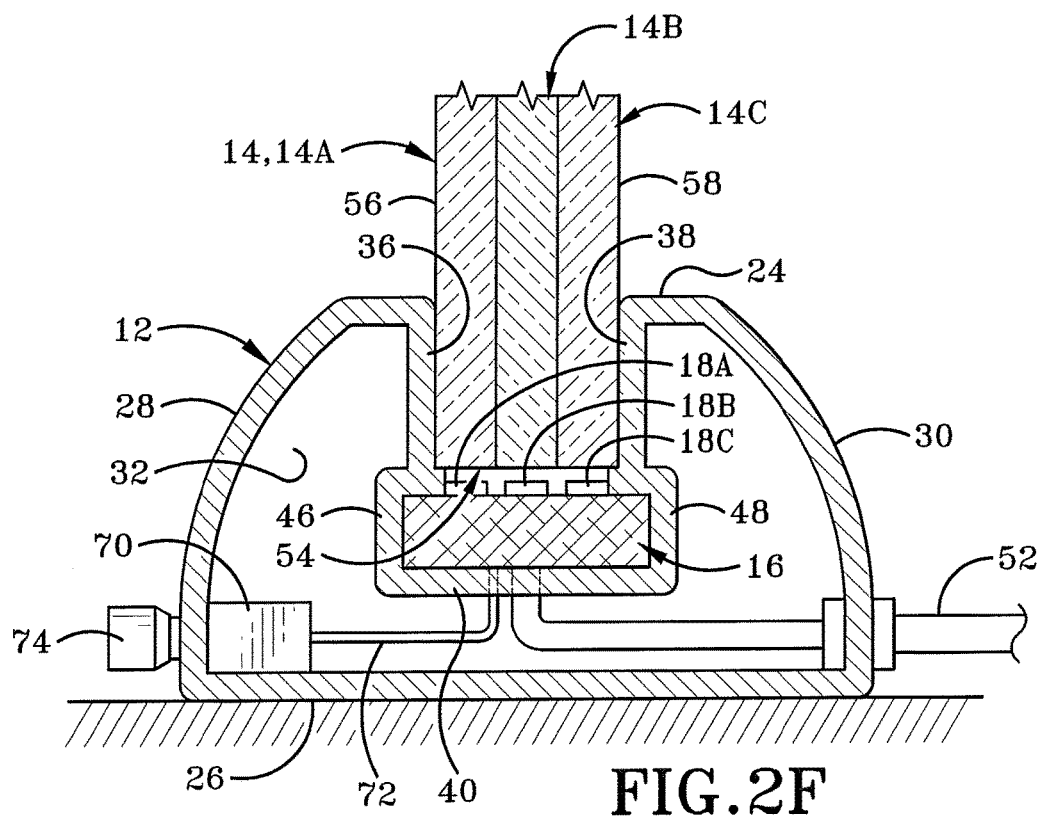
FIG. 2F is a cross section of the base having a USB-based transmitter and receiver carrying the first embodiment of the panel assembly.

FIG. 2F depicts an embodiment of the base 12 having a USB-based receiving port 70 electrically connected via line 72 to one of the microprocessors (described in greater detail below) on the circuit board 16. The port 70 receives a dongle 74 carrying a LED sequencing program code. The dongle 74 may be releasably attached to the panel assembly when not coupled with the port 70. Dongle 74 may be encoded with wireless transceiver logic, such as BlueTooth transmission technology or other Near Field Communications technology, to enable the dongle to receive instructions from a wireless device such as a smart phone and transmit the instructions through the receiving port 70 to the processor or microprocessor 17 on printed circuit board 16. In this instance, the instructions encoded on the smart phone, which is a non-transitory computer readable storage medium, may be sent wirelessly to dongle 74. The instructions that are received in dongle 74 from the smart phone are associated with the panel assembly 14, and more particularly the instructions relate to the design aesthetic of panel assembly 14. As will be described in greater detail below, the instructions command the LEDs 18 when executed by a processor or microprocessor 17 to create an animation sequence corresponding to the panel assembly 14.

FIG. 3 depicts a top view of a printed circuit board 16. The circuit board 16 carries LEDs 18. The LEDs forming the first row 18A are shown offset and staggered from the LEDs forming the second row of LEDs 18B. The third set of LEDs forming third row 18C are staggered from the first and second LED rows 18A, 18B. A processor or microprocessor 17 is also carried by the circuit board 16 and is in operative electrical communication with LEDs 18. The circuit board 16 further comprises a plug 60 at a first end and a receptacle 62 longitudinally opposite the second end. The circuit board 16 may be daisy chained together with additional similar circuit boards 16 as shown in FIG. 4.

FIG. 4 depicts a top view of the base 12 with three circuit boards 16 daisy chained together installed in the lower wider portion 44 of channel 34 with the panel assembly 14 removed. FIG. 4 further depicts a system 10 having a first circuit board 16A disposed proximate the first end 20 of base 12, a second circuit board 16B near the center of base 12, and a third circuit board 16C disposed proximate the second side 22 of base 12. Second circuit board 16B is connected with plug 60 to the receptacle 62 of first circuit board 16A. The third circuit board 160 is connected with plug 60 to receptacle 62 of second circuit board 16B. The plug 60 and receptacle 62 cooperate to create an electrical connection between the three circuit boards 16 such that three circuit boards 16A, 16B, and 160 cooperate to light their respective LEDs 18 in a selectively programmed manner as will be described in greater detail below.

Figure 4A:
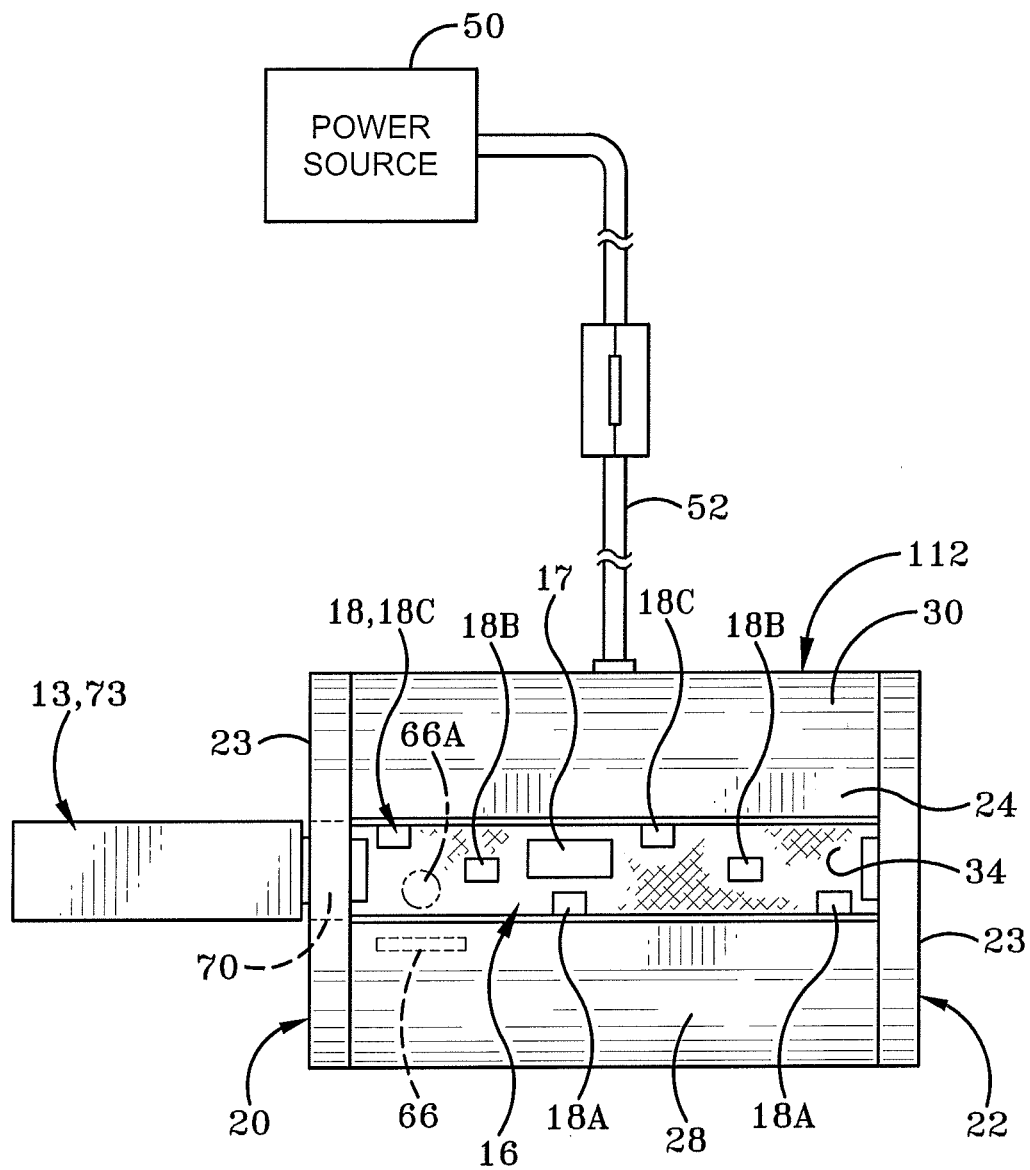
FIG. 4A is a top view of an alternative embodiment of the base having a length matching the length of a single printed circuit board.
Figure 5:
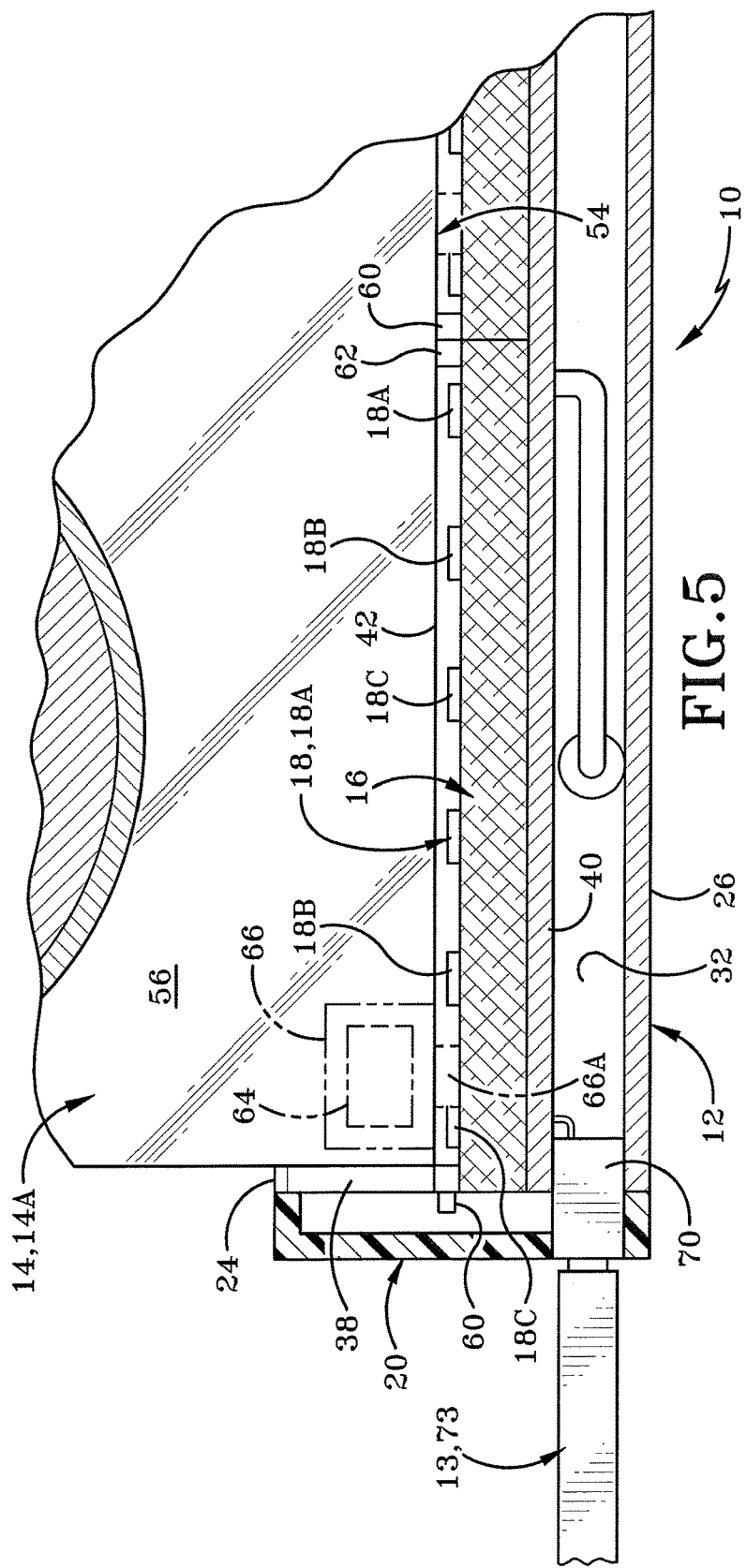
FIG. 5 is a cross section view taken along line 5-5 in FIG. 2C depicting an alternative embodiment with a RFID chip attached to the panel assembly.

It is to be understood that while FIG. 4 depicts three circuit boards 16 daisy chained together to create an electrical circuit or linkage, any number of circuit boards 16 may be used, as one having ordinary skill in the art would understand. The use of a single circuit board 16 (see FIG. 4A) having a longitudinal length of about six inches is contemplated as desirable for ease of manufacture and reducing cost. Clearly, it is to be understood that a single circuit board 16 having a greater length could be utilized if costs permit. Moreover, as depicted in FIG. 4A, an alternative base is provided and is shown generally at 112 which corresponds to the length of a single circuit board 16. It is to be understood that the design of the extruded aluminum base 112 can be of any longitudinal length as the design of the panel assembly permits.

With further reference to the circuit boards 16, it is contemplated that printed circuit boards (PCB) will be utilized. A printed circuit board provides ease of manufacture and reduces costs, in addition to making the system 10 low power and lightweight. While a PCB is preferred for forming the circuit boards 16, other types of circuit boards may be utilized formed with LEDs 18.

In addition to carrying the LEDs 18, the printed circuit board 16 may further include the microprocessor 17 or other LED control logic or a programmable logic controller (PLC). The microprocessor 17 could be operatively connected with an optional RFID chip reader 66A on printed circuit board 16. Inasmuch as chip reader 66A is optional, it is shown throughout the figures in dashed lines to indicate its optional presence. However, it is to be understood that one or more of the embodiments of system 10 could effectively operate through the usage of the chip reader 66. Chip reader 66A is configured to read the chip 64 on panel assembly 14. A set of instructions on the programmed chip 64 directs microprocessor 17 to illuminate the LEDs 18 in a sequenced manner (i.e., a programmed pattern). The microprocessor 17 is operatively connected with the at least computer readable storage medium 13 so as to allow the processor 17 to executed the first instructions encoded on the medium 13. The instructions are executable by the processor or logic and the term "Logic", as used herein, includes but is not limited to hardware, firmware, software and/or combinations of each to perform a function(s) or an action(s), and/or to cause a function or action from another logic, method, and/or system. For example, based on a desired application or needs, the LED control logic may include software controlled microprocessor 17, discrete logic like a processor (e.g., microprocessor 17), an application specific integrated circuit (ASIC), a programmed logic device, a memory device containing instructions, an electric device having a memory, or the like. Logic may include one or more gates, combinations of gates, or other circuit components. Logic may also be fully embodied as software. Where a single logic is described, it may be possible to distribute that single logic between multiple physical logics. Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

In accordance with one aspect of the present disclosure, the panel assembly 14, or panel assembly 114, or panel assembly 214 may be associated with a signal transmitter and the base may be associated with a signal receiver. In one embodiment, the panel assembly may include an radio frequency identification device (RFID) chip 64 attached to the respective panel assembly. The RFID chip 64 is programmed based on the design etched onto the panel assembly. The RFID chip 64 contains a program that identifies which LEDs 18 should light up at certain times and intervals based on the desired design. As will be described in greater detail below, the chip 64 may be programmed with a sufficient number of bytes configured to change the LED 18 color, change the LED 18 intensity, change the LED 18 starting time (i.e., a delayed start), or change the LED 18 lighted intervals, to thereby define an illumination sequence. Each base 12 or 112 may include an RFID reader 66 (FIG. 1). The use of a programmable RFID chip 64 on the panel assembly 14 enables the base 12 to operate as a universal base with the RFID reader 66. Stated otherwise, a consumer may purchase the base 12, 112 having the RFID reader 66. Thereafter, the consumer may purchase a plurality of different panels 14 having alternative designs, wherein each panel with its unique design has an RFID chip 64 programmed thereon which directs the printed circuit board 16 to light LED 18 in a certain pattern (i.e., an illuminated sequence) in order to accomplish the desired etched theme on the individual panels.

In one particular embodiment, the USB-based dongle 74 (FIG. 2F) may act as the signal transmitter. In this exemplary embodiment, the dongle 74 carries the stored program sequence to illuminate the LEDs 18. The dongle 74 is plugged into the USB-based receiving port 70 (which acts as a receiver) to direct the programs sequence carried by dongle 74 to the microprocessor 17 via electrical line 72. In a manner similar to that as described above, when the dongle 74 is plugged into the port 70, the program sequence stored on dongle 74 directs the changing of the LED 18 color, changing of the LED 18 intensity, changing of the LED 18 starting time (i.e., a delayed start), or changing of the LED 18 lighted intervals. Moreover, the program sequence carried by dongle 74 enables individual light control.

In one particular embodiment, the at least one non-transitory computer readable storage medium 13 is a USB flash drive 73 that is plugged into port 70. The port 70 may also be referred to as a receiving port that connects with the non-transitory computer readable storage medium 13 (i.e., USB flash drive 73) to pass the instructions therethrough as the instructions are sent to the processor or microprocessor 17 on the printed circuit board 16. In a manner similar to that as described above, when the USB flash drive 73 is plugged into the port 70, the program sequence stored on USB flash drive 73 directs the changing of the LED 18 color, changing of the LED 18 intensity, changing of the LED 18 starting time (i.e., a delayed start), or changing of the LED 18 lighted intervals. Moreover, the program sequence carried by USB flash drive 73 enables individual light control.

The disclosure relating the usage of RFID chip 64 enabled through chip reader 66, or dongle 74 connectable with port 70, or the USB flash drive 73 connectable with port 70 identifies a broader concept of the present disclosure that base 12 and the microprocessor 17 carried by the printed circuit board 16 are configured to receive a set of instructions from an external storage medium. The external instructions are then transferred to the onboard processor so as to create a self-contained system 10 that does not require wires or other platforms to drive the illumination sequence. Accordingly, other input devices carrying sets of instructions encoded thereon may be possible beyond those which are disclosed. Furthermore, it may be possible to incorporate a dongle, such as dongle 74, with Bluetooth technology so as to allow the instructions to be wirelessly imported from a smart phone to the base 12 via a Bluetooth dongle. Thus, in one exemplary embodiment, the computer readable storage medium 13 having instructions encoded thereon may be generically referred to as an input device that is able to pass the instructions to the processor microprocessor 17. This enables the LEDs 18 to alter their illumination sequence based on the panel assembly 14 that is supported by base 12. Thus, the animation effect (or illumination sequence) of system 10 is dynamic and is able to change depending on the panel assembly 14 that is inserted into the base 12. Stated otherwise, the illumination effect is different between different sets of panel assemblies having different designs etched thereon.

Prior to the operation of system 10, a manufacturer or designer will create an aesthetically pleasing design for etching onto the acrylic panel assembly 14. The design may encompass a variety of aesthetic features such as patriotic themes, other holiday themes, or corporate or team logos.

Moreover, the design may originate from a computer program as one having ordinary skill in the art would understand. After the design has been created in the computer program, a laser etching system may be utilized to transfer the design onto the panel assembly 14. Alternatively, other etching systems could be utilized, such as a mechanical etching system, or a sand-blasting system, or a manual (i.e., free hand/hand operated) engraving/etching system could be utilized to create the design on the panel assembly.

In one particular embodiment, the design created in the computer program will recognize which colors from the LEDs 18 are associated with which portion of the design. For example, as depicted in FIG. 1, through the use of multiple panels 14A, 14B, and 14C, the laser etching program will only laser etch those portions of the design that are to be illuminated with a single color. Thus, portions of the design that are to be illuminated red are laser etched onto the first panel 14A. The portions of the design that are to be illuminated white are laser etched onto the second panel 14B. The portions of the design that are to be illuminated in blue are laser etched onto the third panel 14C.

Moreover, other embodiments provide individual LED control such that one LED in a row could illuminate upwardly in a different color than the other LEDs in the same row of LEDs. For example, a majority of the LEDs forming the front row of LEDs 18A may be illuminated in a first color (such as red), and at least one LED in the front row of LEDs 18A may be illuminated in a second color different from the first color (such as blue). Thus, the programming enables individual LED control which provides greater sequencing to create animated themes (for example a patriotic theme where a flag may be waiving in the wind).

After the panels 14A, 14B, and 14C have been etched, the panel assembly 14 may be assembled. In the embodiment where the interface is created by directly connecting the panels together, the panel assembly 14 may be chemically or mechanically connected together to define the common bottom edge 54. Other embodiments may produce a slight separation between the panels if so desired. One having ordinary skill in the art would easily understand that either panel assembly 14 would accomplish similar goals of the present disclosure.

In the alternative embodiment of panel assembly 114, the first and second panels 114A, 114B may be connected with a spacer 114C. The spacer 114C is positioned at the rear portion of the panel assembly 114 and be beneficial in a design that required only two colors to illuminate the design but was still used with the universal base 12 in accordance with the present disclosure. It is contemplated that this version would prove beneficial when a manufacturer sells the universal base 12 and then is able to retail multiple different panel assemblies with different designs thereon for various holidays, times of the year, themes, or the like.

Another alternative embodiment of the present disclosure provides panel assembly 214 that may be etched with a design on the first panel 214A of panel assembly 214. In this version, two spacers 214B, 214C may be utilized to create the overall width of the collective bottom edge 54 which would enable a retailer to sell the programmable base 12 as an individual unit and then allow multiple panel assemblies to be retailed individually for attachment thereto.

Each panel assembly 14, 114, 214 described above includes either a RFID chip 64 thereon, a dongle 74, or a USB flash drive 73 associated therewith. The RFID chip 64, dongle 74, or USB flash drive 73 is preferably preprogrammed by the designer to illuminate the panel assembly in accordance with the designer's aesthetic intention. The RFID chip 64, dongle 74, or USB flash drive 73 is associated with the panel assembly 14, 114, 214 and directs the microprocessor 17 on printed circuit board 16 to illuminate LEDs 18 in a desired programmed manner, for example the first illumination sequence.

In operation and with respect to system 10, a user will place the base 12 on a supportive surface and plug base 12 into a power source such that power is fed through line 52 to the LEDs 18. A panel assembly, such as panel assembly 14, is inserted into the channel 34 by lowering the bottom portion of panel assembly 14 downwardly along the vertical axis. In one particular embodiment, the collective lower edge 54 of panel assembly 14 engages ledge 42 and is supported thereby. When the panel assembly 14 is seated on ledge 42, the chip 64 on panel assembly 14 may be read by the RFID chip reader 66 carried by base 12. In other alternative embodiments, the RFID chip reader 66A may be located on the printed circuit board 16. In other embodiments, a signal carrying the instructions of the program sequence may be transmitted from dongle 74 or flash drive 73 through port 70 to microprocessor 17. In either scenario, the chip reader 66 or 66A or port 70 accomplishes the task of receiving the programmed sequence (on chip 64 or dongle 74 or USB flash drive 73) and directs the microprocessor 17 to illuminate LEDs 18 in the programmed manner (i.e., in the desired sequence). Notably, some programs carried by chip 64 or dongle 74 or USB flash drive 73 control each individual LED independently from other LEDs carried by circuit board 16. While other programs direct an entire row of LEDs to light up in a desired color at a desired time.

Figure 6:
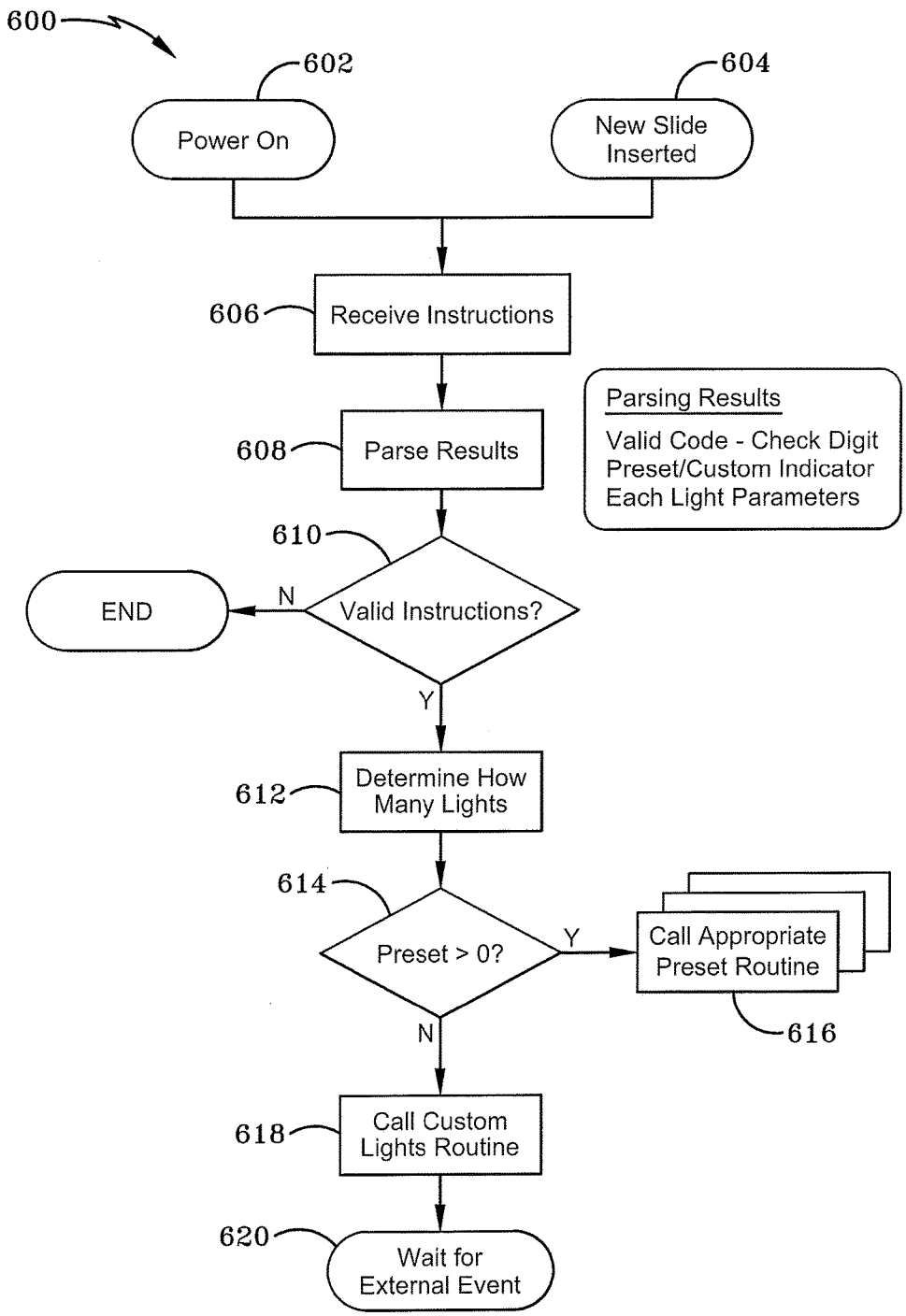
FIG. 6 is a flow chart depicting an exemplary method in accordance with the present disclosure.

In operation and with reference to FIG. 6, an exemplary method of use of system 10 is disclosed generally at 600. Initially, the system is powered on as shown at 602. Then, around the same time, a new panel assembly 14 may be inserted into the base 12, which is shown generally at 604. Thereafter, the receiver (i.e., reader 66 or 66A or port 70) scans, or receives and reads the transmitted signal of illumination instructions (either from RFID chip 64 or dongle 74 or USB flash drive 73), which is shown generally at 606. After the instructions (from either chip 64 or dongle 74 or USB flash drive 73) has been read/received, the results are parsed, which is shown generally at 608. Parsing of the results ensures that a valid code is established and digits of the transmitted instructions (from RFID chip 64 or dongle 74 or USB flash drive 73) are checked to determine whether the programmed code thereon indicates a preset indicator of LEDs 18 to illuminate based on the parameters set with each. The parsing of the results could also indicate an optional custom light design. The validity of the instructions (from chip 64 or dongle 74 or USB flash drive 73) is then confirmed at step 610. If it is determined that the signal (from chip 64 or dongle 74 or USB flash drive 73) is invalid, no further action occurs. With valid instructions, the microprocessor 17 then determines how many lights are utilized at 612. Microprocessor 17 determines which preset values are greater than zero at 614. For preset values greater than zero, the microprocessor executes an execution call for an appropriate routine according to the instructions at 616 which will illuminate LEDs 18 with the preprogrammed design dictated by the instructions (from chip 64 or dongle 74 or USB flash drive 73). If the preset value at step 614 is less than or equal to zero, a custom execution call for a light routine is established at step 618. In this scenario, an external event of requesting the operator to program the LEDs 18 occurs at step 620.

The instructions instruct or dictate the plurality of LED lights 18 to illuminate the first panel 14A, the second panel 14B, and the third panel 14C in the first sequenced manner to illuminate the first design, the second design, and the third design, respectively etched on the first, second, and third panels. Furthermore, the instructions may be coordinated with a sound file stored in the at least one non-transitory computer readable storage medium 13 and synced therewith so as to allow the processor or microprocessor 17 to play the sound file, via a speaker in the base, in a coordinated manner with the first illumination sequence. The speaker may be on the PCB or may be separate from the PCB and carried by the base but in electrical communication with the processor. The sound file may contain general sounds or portions of musical songs with appropriate copyright licenses.

In a broader sense, system 10 enables a user to selectively control an illumination sequence from LEDs 18 based on instructions that the user chooses to connect with the processor or microprocessor 17 in a selective manner. The selective manner may be accomplished by the association with the etchings on the panel assembly 14. Furthermore, this concept may be broadened to controlling any light through the use of a non-transitory computer readable storage medium 13 having instructions encoded thereon that, when executed by the processor, cause the LEDs 18 to illuminate or turn on or otherwise change color or other properties in a sequenced manner in accordance with the encoded instructions. Thus, an exemplary method in accordance with the present disclosure may comprise the steps of providing a light source in electrical communication with a processor that receives instructions from a removable storage medium; and illuminating the LEDs in a sequenced manner in accordance with the instructions from the selectively removable storage medium. An exemplary method may comprising the steps of: providing a set of first instructions encoded on a first non-transitory computer readable storage medium that when executed by at least one processor, results in illuminating at least one light in a first sequenced manner; connecting, in a selective and releasable manner, the first non-transitory computer readable storage medium to the at least one processor in electrical communication with the at least one light; executing the set of first instructions in the at least one processor carried by a base that also support the at least one light; and Illuminating the at least one light in the first sequenced manner.

Figure 7:
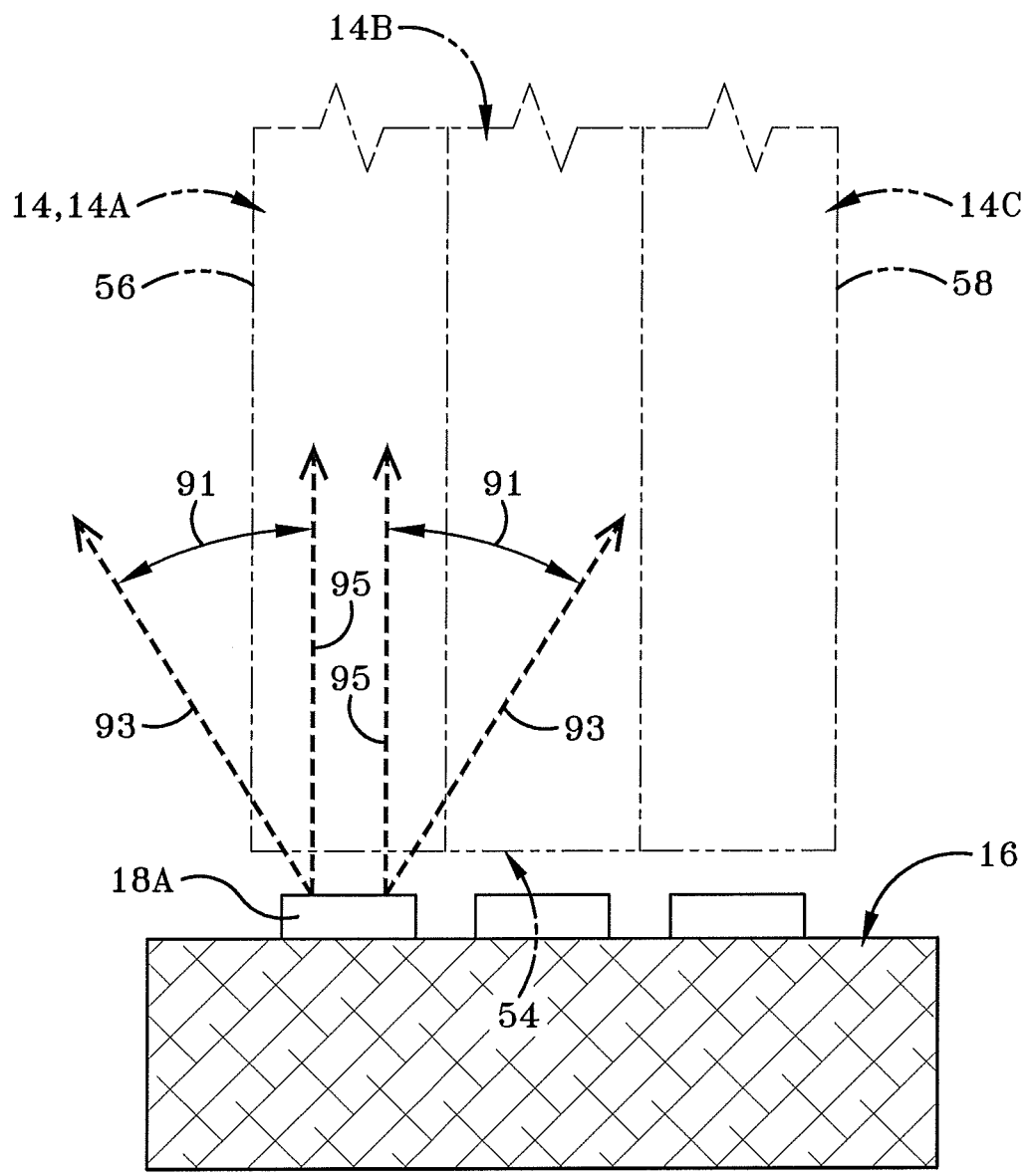
FIG. 7 is an enlarged schematic view of the printed circuit board carrying the LEDs thereon which may be selectively controlled by the instructions encoded on a non-transitory computer readable storage medium.

FIG. 7 depicts an exemplary operation of how the instructions may alter the broadcast pattern of the light emitted from the LEDS 18. For example, the instructions may be written in a manner that can vary the broadcast angle 91 of the light between a wide pattern 93 and a narrow beam pattern 95.

Figure 8:
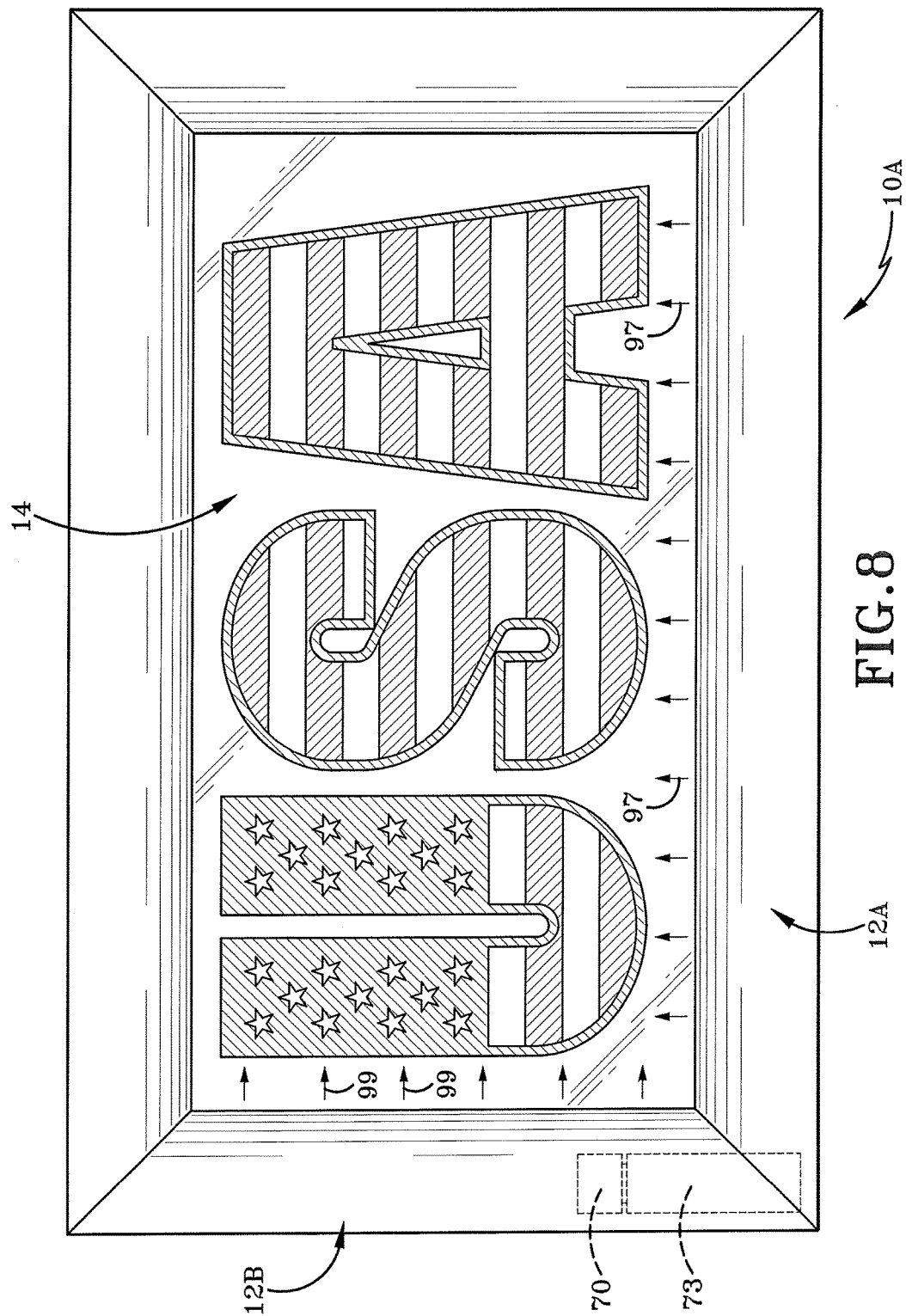
FIG. 8 is an alternative embodiment of the display system generally in the shape of a picture frame having two bases connected together in order to transmit or broadcast light in a vertical direction and in a horizontal direction.

FIG. 8 depicts an alternative embodiment of the present disclosure depicting a display system generally at 10A. Display system 10A is fabricated similar to a picture frame utilizing a first base 12A and a second base 12B. The longitudinal length of first base 12A is generally orthogonal to the longitudinal length of second base 12B. Each respective base 12A, 12B has a printed circuit board carrying lights thereon in a manner similarly described above with respect to system 10. System 10A enables the first base 12A to illuminate the lights in a vertically upward manner as indicated by arrows 97. The second base 12B transmits light in a generally horizontal manner as indicated by arrows 99. Collectively, first base 12A and second base 12B operate in conjunction with each other in accordance with instructions carried by the USB flash drive 73 that can be received by port 70 on either one of the first base 12A or second base 12B. As is well understood, either first base 12A or second base 12B may be formed with one or more brackets to assist in the mounting of the picture frame styled system 10A onto a vertical substrate such as a wall.

Similar to system 10, system 10A has a processor or microprocessor 17 that is directly connected to the printed circuit board 16. Thus, the processor or microprocessor 17 of both system 10 and system 10A are considered on board processors and are not external processors. Because the processor or microprocessor 17 is an on board processor, this enables the system 10, 10A to be self-contained and does not require external processing during the reading and interpreting of the instructions carried by the non-transitory computer readable storage medium 13. However, it is to be understood that the non-transitory computer readable storage medium 13 is an external storage medium of the system. More particularly, the storage medium is external to base 12. The storage medium is considered external to base 12 because the instructions are either on the RFID chip 64 (which is carried by the panel assembly 14), or the instructions are on dongle 74, or the instructions are on the USB flash drive 73, all of which are external to the base 12 which carries the printed circuit board 16 connected with the processor or microprocessor 17 and the LEDs 18.

Figure 9:
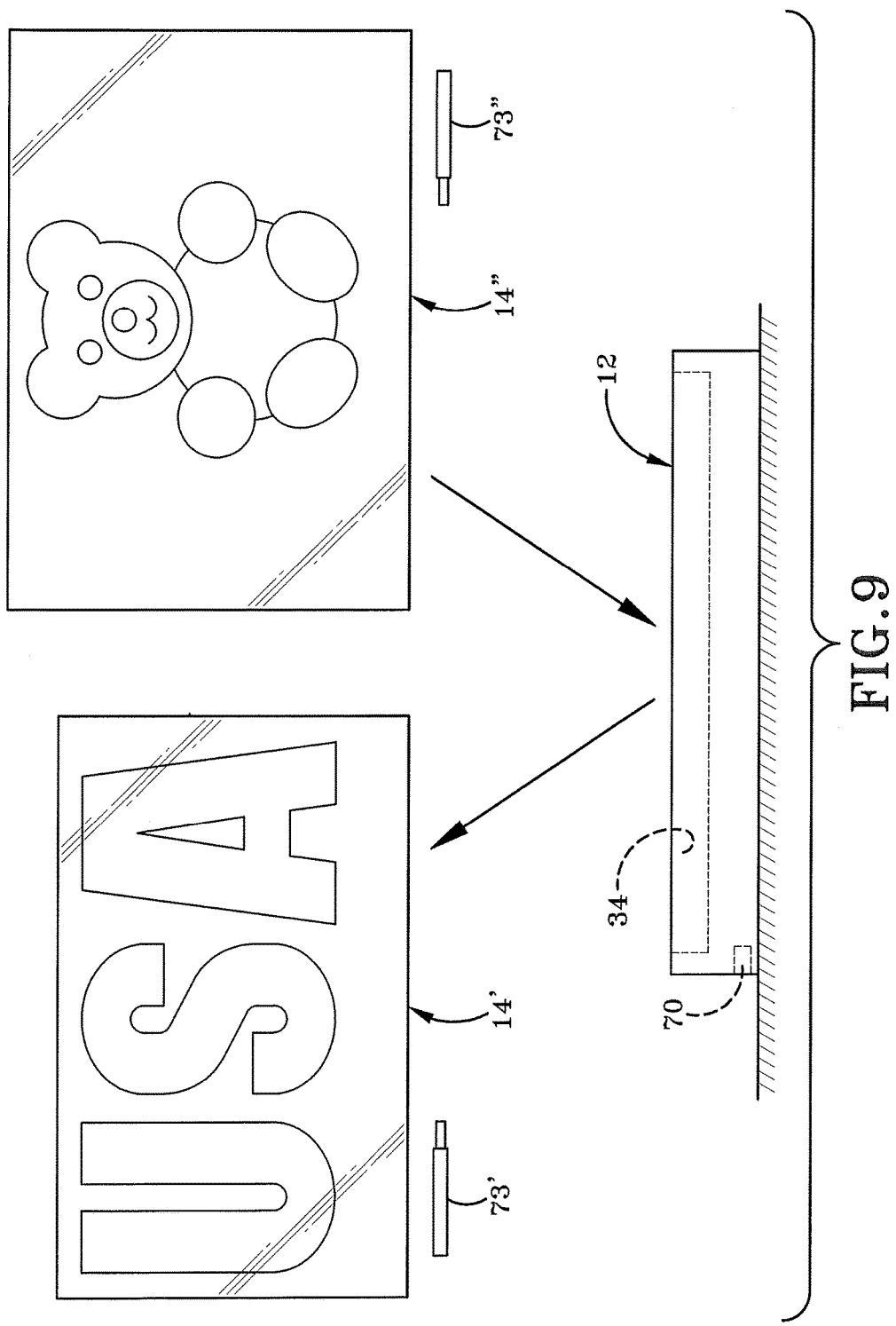
FIG. 9 is a diagrammatic operational view of one base that is used in a universal manner to illuminate different panel assemblies based on instructions encoded on different non-transitory computer readable storage mediums that are respectively associated with the different panel assemblies.

In operation and with respect to FIG. 9, the universality of base 12 is depicted. After the method 600 has been performed for a first panel assembly 14', and when the operator desires to finish displaying the first panel assembly 14', the first panel assembly 14' may be removed from the channel in base 12 as indicated by the removal arrow in FIG. 9. Furthermore, the first USB flash drive 73' encoded with instructions associated with the first panel assembly 14' may be removed from port 70 on base 12. Thereafter, a second panel assembly 14" (which also mat referred to in the appended claims as an "other panel" or "other panel assemblies") may be inserted in to the channel on base 12, as indicated by the insertion arrow in FIG. 9. And, the second USB flash drive 73" which has a set of second instructions corresponding to a second design on the second panel assembly 14" may be connected with port 70. Thereafter, the method 600 of FIG. 6 runs for the second panel assembly 14". Thus, FIG. 9 depicts that the set of first instructions on the first storage medium are associated with the first panel assembly 14' so as to allow the base 12 to be universally utilized by other panel assemblies (such as panel assembly 14") when the other panel assemblies are to be illuminated by the plurality of lights while connected with the base 12, wherein the illumination of the other panel assemblies occurs in a second sequenced manner and is based on other instructions from a different non-transitory computer readable storage medium (i.e., second flash drive 73").

FIG. 9 additionally supports the method including the steps of: providing a base 12 defining a channel sized to receive a first panel assembly 14' having a design thereon, and the base including a plurality of lights configured to illuminate the first panel assembly; inserting the first panel assembly 14' into the channel; providing a set of first instructions encoded on a first non-transitory computer readable storage medium 73' that when executed by at least one processor, results in illuminating the first panel assembly with the plurality of lights in a first sequenced manner; selectively connecting the first non-transitory computer readable storage medium 73' to the at least one processor (e.g., via port 70); executing the set of first instructions in the at least one processor; illuminating the first panel assembly 14' with the plurality of lights in the first sequenced manner in accordance with the set of first instructions; and removing the first panel assembly 14' from the channel and disconnecting the first non-transitory computer readable storage medium 73'; inserting a second panel assembly 14" into the channel; providing a set of second instructions encoded on a second non-transitory computer readable storage medium 73" that when executed by the at least one processor, results in illuminating the second panel assembly with the plurality of lights in a second sequenced manner.

With respect to the set of first instructions and second instructions, they may be programmed or coded in any known manner as one having ordinary skill in the art would understand. In one example, the first and second instructions are coded via hex code which can be easily implemented by the processor 17. The hex code programming of first instructions and second instructions enable control of the lights 18 which, when executed collectively, illuminate the lights in the first sequenced manner or the second sequenced manner, respectively. In one example, the instructions are able to turn each individual light from the plurality of lights 18 on/off, control each individual lights 18 intensity, control each individual lights 18 color, and control each individual lights 18 length of illumination. These may be collectively programmed (such as in hex code) in a manner that is an illumination sequence. For example, the instructions associated with the first panel assembly 14 having the "USA" design thereon may alter their illumination time with respect to lights in an individual row so as to create a waving flag effect. This is only one example and other sequences are entirely possible using the hex coded first instructions and second instructions. Typically, The hex coded first instructions and hex coded second instructions are preprogrammed by the manufacturer of the panel assemblies. However, it is entirely possible for a manufacturer to provide a computer program which enables the user to self-code a set of instructions and store the same on a computer readable storage medium. In the event that the user desires to self-code a set of instructions, they may do so using a visual basic program editor. However, other programming editors are entirely possible. Once the instructions have been created, they may be saved on a non-transitory computer readable storage medium such as a USB flash drive, or SD card, or the like. This gives the end user the opportunity to program their base unit in a customized manner.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

Further, it should be appreciated that a smartphone to send instructions to dongle 74 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), or any other suitable portable or fixed electronic device.

Also, a computer or smartphone may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the disclosure. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A display system comprising:
a first panel assembly having an etched design to be illuminated, wherein the first panel assembly is at least partially formed from an acrylic polymer;
a base carrying a plurality of individually controllable and independent lights disposed proximate an upwardly open channel sized to repeatably receive a portion of the first panel assembly;
at least one processor carried by the base and electrically connected to the plurality of individually controllable and independent lights;
at least one non-transitory computer readable storage medium selectively connected with the at least one processor, the storage medium having first instructions encoded thereon that, when executed by the at least one processor, results in illuminating the panel assembly with the plurality of individually controllable and independent lights by directing one of a color change, an intensity change, an alternate start time, and an alternate interval time of at least two different lights from the plurality in a first sequenced manner, and wherein the at least one processor receives the instructions and executes an illumination sequence in the first sequenced manner responsive to receiving the instructions;
wherein the first instructions are associated with the first panel assembly so as to allow the base to be universally utilized by other panel assemblies when the other panel assemblies are to be illuminated by the plurality of individually controllable and independent lights while connected with the base, wherein the illumination of the other panel assemblies occurs in a second sequenced manner and is based on other instructions from a different non-transitory computer readable storage medium; and
a spacer on the first panel assembly or the other panel assemblies, wherein lights in a row below the spacer are turned off in response to the spacer being attached to the first panel assembly or the other panel assemblies.

2. The display system of claim 1, wherein the first panel assembly includes a first panel having a first design etched thereon, a second panel having a second design etched thereon, and a third panel having a third design etched thereon; and
wherein the first instructions instruct the plurality of individually controllable and independent lights to illuminate the first panel, the second panel, and the third panel in the first sequenced manner to illuminate the first design, the second design, and the third design.

3. The display system of claim 1, further comprising:
a port on the base, wherein the first instructions and the other instructions pass through the port, wherein the at least one non-transitory computer readable storage medium is externally and removably connected to the base via the port when the first instructions are executed by the at least one processor to direct the color change, the intensity change, the alternate start time, and the alternate interval time of the at least two different lights from the plurality in the first sequenced manner.

4. The display system of claim 3, wherein the port is a universal serial bus (USB) port, and the first instructions are saved on a first USB flash drive and the other instructions are saved on a second USB flash drive.

5. The display system of claim 3, wherein the at least one non-transitory computer readable storage medium having the first instructions encoded thereon is selectively connectable with the port in response to the first panel assembly being inserted into the base.

6. The display system of claim 1, further comprising:
a sound file stored in the at least one non-transitory computer readable storage medium and synced with the first instructions so as to allow the at least one processor to play the sound file in a coordinated manner with the first illumination sequence.

7. The display system of claim 1, further comprising:
a power cable connected with the base;
wherein the display system includes no other wires or cables extending through the base so as to allow the display system to be an entirely autonomous and self-contained lighting apparatus.

8. The display system of claim 1, further comprising:
a printed circuit board (PCB) positioned within the channel defined by the base;
wherein the processor and the plurality of individually controllable and independent lights are connected to one another through the PCB; and
wherein lights from the plurality of individually controllable and independent lights are arranged in rows on the PCB to position the lights below the first panel assembly, wherein the number of rows of lights positioned below the first panel assembly equals the number of acrylic panels forming the first panel assembly.

9. The display system of claim 1, further comprising:
a second panel assembly having a second design different than the first panel assembly;
a set of second instructions configured to illuminate the second panel assembly in a second sequenced manner with the plurality of individually controllable and independent lights different than the first sequenced manner, so as to enable the base to perform in a universal manner in response to receiving the first and second instructions.

10. A method comprising the steps of:
providing a base defining an upwardly open channel sized to receive a first panel assembly formed from a plurality of individual acrylic panels having an etched design thereon, and the base including a plurality of individually controllable and independent lights configured to illuminate the first panel assembly;
inserting the first panel assembly into the channel;
providing a set of first instructions encoded on a first non-transitory computer readable storage medium that when executed by at least one processor, results in illuminating the first panel assembly with the plurality of individually controllable and independent lights by directing one of a color change, an intensity change, an alternate start time, and an alternate interval time of at least two different lights from the plurality in a first sequenced manner;
selectively connecting the first non-transitory computer readable storage medium to the at least one processor;
executing the set of first instructions in the at least one processor;

illuminating the first panel assembly with the plurality of individually controllable and independent lights in the first sequenced manner in accordance with the set of first instructions;

removing the first panel assembly from the channel and disconnecting the first non-transitory computer readable storage medium;

inserting a second panel assembly into the channel;

providing a set of second instructions encoded on a second non-transitory computer readable storage medium that when executed by the at least one processor, results in illuminating the second panel assembly with the plurality of individually controllable and independent lights by directing one of a color change, an intensity change, an alternate start time, and an alternate interval time of at least two different lights from the plurality in a second sequenced manner; and wherein when a spacer is present on the first panel assembly or the second panel assembly, then turning off lights in a row below the spacer.

11. The method of claim 10, further comprising:

selectively connecting the second non-transitory computer readable storage medium to the at least one processor;

executing the set of second instructions in the at least one processor;

illuminating the second panel assembly in the second sequenced manner in accordance with the set of second instructions.

12. The method of claim 10, wherein the step of selectively connecting the first non-transitory computer readable storage medium to the at least one processor is accomplished by inserting a USB flash drive into a port on the base.

13. The method of claim 10, wherein the step of selective connecting the first non-transitory computer readable storage medium to the at least one processor is accomplished when the panel assembly is inserted into the channel with a chip connected to the first panel which is read by a chip reader located in the base.

14. The method of claim 10, further comprising:

altering a broadcast pattern of the light emitted from the plurality of lights from a wide beam pattern to a narrow beam pattern.

15. The method of claim 10, further comprising:

controlling a broadcast pattern of each light illuminating upwardly into one individual acrylic panel so as to prevent light from projecting into an adjacent panel of the first panel assembly.

\* \* \* \* \*